United States Patent
Toya

(10) Patent No.: US 10,014,701 B2
(45) Date of Patent: Jul. 3, 2018

(54) STORAGE BATTERY HOUSING DEVICE

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 15/045,345

(22) Filed: Feb. 17, 2016

(65) Prior Publication Data
US 2016/0268822 A1 Sep. 15, 2016

(30) Foreign Application Priority Data

Mar. 9, 2015 (JP) .................................. 2015-045888

(51) Int. Cl.
*H02J 7/00* (2006.01)
*H02J 7/34* (2006.01)
*H02J 9/06* (2006.01)

(52) U.S. Cl.
CPC ............ *H02J 7/0042* (2013.01); *H02J 7/007* (2013.01); *H02J 7/0026* (2013.01); *H02J 7/0045* (2013.01); *H02J 7/0047* (2013.01); *H02J 7/0068* (2013.01); *H02J 7/34* (2013.01); *H02J 9/062* (2013.01); *H02J 2007/005* (2013.01); *H02J 2007/0096* (2013.01); *Y02T 10/7055* (2013.01)

(58) Field of Classification Search
USPC ........................................................ 320/112
See application file for complete search history.

(56) References Cited

U.S. PATENT DOCUMENTS

| | | | |
|---|---|---|---|
| 2004/0160214 A1* | 8/2004 | Blair ..................... | H02J 7/0022 320/118 |
| 2013/0342018 A1* | 12/2013 | Moon ...................... | H02J 5/00 307/80 |
| 2014/0240204 A1* | 8/2014 | Chen ...................... | G02B 27/01 345/2.3 |

FOREIGN PATENT DOCUMENTS

JP        2014-128113        7/2014

* cited by examiner

*Primary Examiner* — Robert Grant
(74) *Attorney, Agent, or Firm* — Greenblum & Bernstein, P.L.C.

(57) ABSTRACT

A storage battery housing device is provided that comprises a casing that includes a shelf on which a storage battery pack is placed, and a connector that is provided at the rear of the shelf and has the storage battery pack detachably and electrically connected thereto. The storage battery housing device also includes a power reception plug that is connected to an external power source and receives power from the external power source. The storage housing device further includes a charging control circuit that uses the power received by the power reception plug to charge, via the connector, the storage battery pack connected to the connector.

18 Claims, 8 Drawing Sheets

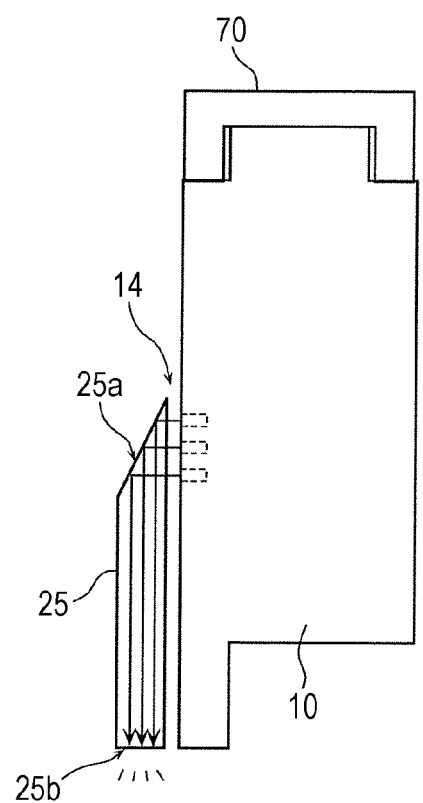

STORAGE BATTERY HOUSING DEVICE

BACKGROUND

1. Technical Field

The present disclosure relates to a storage battery housing device that charges or discharges a storage battery pack.

2. Description of the Related Art

Japanese Unexamined Patent Application Publication No. 2014-128113 discloses a power storage device that houses a storage battery pack and uses externally supplied power to charge the storage battery pack.

SUMMARY

However, in the aforementioned conventional power storage device, insufficient consideration has been given to facilitating attachment and detachment of a storage battery pack.

In light of the aforementioned situation, one non-limiting and exemplary embodiment provides a storage battery housing device with which it is easier to attach and detach a storage battery pack than in the past.

In one general aspect, the techniques disclosed here feature a storage battery housing device that includes: a casing that includes a shelf on which a storage battery pack is placed; a connection unit that is provided at the rear of the shelf and has the storage battery pack detachably and electrically connected thereto; a power reception unit that is connected to an external power source and receives power from the external power source; and a charging unit that uses the power received by the power reception unit to charge, via the connection unit, the storage battery pack connected to the connection unit.

These general and specific aspects may be implemented using a system and a method, and any combination of systems and methods.

According to the present disclosure, a storage battery housing device with which it is easier to attach and detach a storage battery pack than in the past is realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a drawing (top view) for describing light guiding performed by a second display unit;

DETAILED DESCRIPTION

Figure 1:
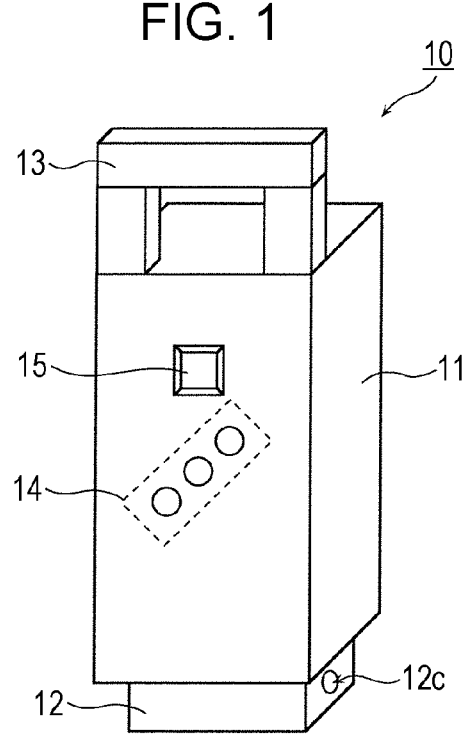
FIG. 1 is an external view in which a storage battery pack according to embodiment 1 is seen from a front surface side.

A storage battery housing device according to a first aspect of the present disclosure includes: a casing that includes a shelf on which a storage battery pack is placed; a connection unit that is provided at the rear of the shelf and has the storage battery pack detachably and electrically connected thereto; a power reception unit that is connected to an external power source and receives power from the external power source; and a charging unit that uses the power received by the power reception unit to charge, via the connection unit, the storage battery pack connected to the connection unit.

Thus, a user can easily connect the storage battery housing device and the storage battery pack by merely pushing the storage battery pack along the shelf into the storage battery housing device. Furthermore, in a state in which the storage battery housing device and the storage battery pack are connected, the user can easily detach the storage battery housing device and the storage battery pack by merely pulling the storage battery pack along the shelf. Consequently, it is easier to attach and detach a storage battery pack than in the past.

A storage battery housing device according to a second aspect of the present disclosure may, in the storage battery housing device of the first aspect, further include: an acquirer that acquires information indicating a state of the storage battery pack from the storage battery pack; and control circuitry that, based on the information acquired by the acquirer, controls charging of the storage battery pack using the charging unit.

Thus, the storage battery housing device can control charging in accordance with the state of the storage battery pack.

A storage battery housing device according to a third aspect of the present disclosure may, in the storage battery housing device of the first aspect, further include: a discharging unit that discharges, via the connection unit, the storage battery pack connected to the connection unit; and a power supply unit that supplies, to an external electrical device, power of the storage battery pack discharged by the discharging unit.

Thus, the storage battery housing device can supply power to the external electrical device using the power of the storage battery pack.

A storage battery housing device according to a fourth aspect of the present disclosure may, in the storage battery housing device of the third aspect, further include: an acquirer that acquires information indicating a state of the storage battery pack from the storage battery pack; and control circuitry that, based on the information acquired by the acquirer, controls discharging of the storage battery pack using the discharging unit.

Thus, the storage battery housing device can control discharging in accordance with the state of the storage battery pack.

A storage battery housing device according to a fifth aspect of the present disclosure may, in the storage battery housing device of the first or third aspect, further include: an acquirer that acquires information indicating a state of the storage battery pack from the storage battery pack; and a notification unit that, based on the information acquired by the acquirer, externally notifies an abnormality of the storage battery pack.

Thus, the storage battery housing device can externally notify an abnormality of the storage battery pack.

A storage battery housing device according to a sixth aspect of the present disclosure may, in the storage battery housing device of the first or third aspect, further include: an acquirer that acquires information indicating a state of the storage battery pack from the storage battery pack; and a notification unit that, based on the information acquired by the acquirer, externally notifies information prompting use of the storage battery pack to be stopped.

Thus, the storage battery housing device can externally notify information prompting use of the storage battery pack to be stopped.

A storage battery housing device according to a seventh aspect of the present disclosure may, in the storage battery housing device of the first or third aspect, further include: an acquirer that acquires information indicating a state of the storage battery pack from the storage battery pack; and a notification unit that, based on the information acquired by the acquirer, externally notifies information indicating a lifespan of the storage battery pack.

Thus, the storage battery housing device can externally notify information indicating the lifespan of the storage battery pack.

A storage battery housing device according to an eighth aspect of the present disclosure may, in the storage battery housing device of the first or third aspect, further include: an acquirer that acquires information indicating a state of the storage battery pack from the storage battery pack; a communication unit that communicates with an external server device; and control circuitry that uses the communication unit to transmit the information acquired by the acquirer to the server device.

Thus, the storage battery housing device can transmit the information indicating the state of the storage battery pack to the external server device.

A storage battery housing device according to a ninth aspect of the present disclosure may, in the storage battery housing device of the first or third aspect, include an acquirer that acquires information of the storage battery pack from the storage battery pack, the acquirer being provided at the rear of the shelf.

Thus, the acquirer can be formed as a single unit with the connection unit.

A storage battery housing device according to a tenth aspect of the present disclosure may, in the storage battery housing device of the first, third, or ninth aspect, include an acquirer that acquires information of the storage battery pack, the acquirer being a terminal that is connected to a communication terminal provided in the storage battery pack.

Thus, the storage battery housing device can acquire the information of the storage battery pack from the storage battery pack by wired communication through the terminal.

A storage battery housing device according to an eleventh aspect of the present disclosure may, in the storage battery housing device of the first, third, or ninth aspect, include an acquirer that acquires information of the storage battery pack, the acquirer being a second wireless communication unit that performs short-distance wireless communication with a first wireless communication unit provided in the storage battery pack.

Thus, the storage battery housing device can acquire the information of the storage battery pack from the storage battery pack by short-distance wireless communication.

In a storage battery housing device according to a twelfth aspect of the present disclosure, the second wireless communication unit may, in the storage battery housing device of the eleventh aspect, perform the short-distance wireless communication with the first wireless communication unit in accordance with a near field communication (NFC) standard.

Thus, the storage battery housing device can acquire the information of the storage battery pack from the storage battery pack in accordance with the NFC standard.

A storage battery housing device according to a thirteenth aspect of the present disclosure may, in the storage battery housing device of the first or third aspect, further include a display unit that displays information indicating a state of the storage battery pack.

Thus, the storage battery housing device can display the state of the storage battery pack.

A storage battery housing device according to a fourteenth aspect of the present disclosure may, in the storage battery housing device of the thirteenth aspect, have the display unit provided on the shelf, with the information indicating the state of the storage battery pack, which is displayed on a side surface of the battery pack, being reflected and projected toward the front of the shelf.

The display unit having a configuration such as this can easily display the state of the storage battery pack by using the information displayed on the storage battery pack.

A storage battery housing device according to a fifteenth aspect of the present disclosure may, in the storage battery housing device of the third aspect, further include: a plurality of first connection units that connect a plurality of storage battery packs in parallel; a plurality of second connection units that are provided inside the casing and connect a plurality of storage battery packs in series; and control circuitry that supplies power to the external electrical device connected to the power supply unit, by using the discharging unit to discharge at least the storage battery packs connected to the plurality of second connection units.

Thus, the storage battery housing device can efficiently supply alternating-current power by using the storage battery packs connected in series.

A storage battery housing device according to a sixteenth aspect of the present disclosure may, in the storage battery housing device of the fifteenth aspect, have the plurality of second connection units arranged inside the casing in positions where it is more difficult for the storage battery packs to be attached and detached thereto than the plurality of first connection units.

Thus, it is possible to suppress the storage battery packs connected to the second connection units from being erroneously detached.

A storage battery housing device according to a seventeenth aspect of the present disclosure may, in the storage battery housing device of the third aspect, further include a switching unit that switches between supplying power from the external power source to the external electrical device connected to the power supply unit, and supplying power to the external electrical device connected to the power supply unit by the discharging unit discharging the storage battery pack connected to the connection unit.

Thus, the storage battery housing device can switch between power supply sources.

A storage battery housing device according to an eighteenth aspect of the present disclosure may, in the storage battery housing device of the seventeenth aspect, further include control circuitry that, when a power supply from the external power source stops, uses the switching unit to supply power from the storage battery pack to the external electrical device connected to the power supply unit.

Thus, the storage battery housing device can continue to supply power even when there is a power failure.

A storage battery housing device according to a nineteenth aspect of the present disclosure may, in the storage battery housing device of the first or third aspect, further include: a fixing unit that fixes, to the connection unit, the storage battery pack connected to the connection unit; and control circuitry that, when a power storage amount of the storage battery pack connected to the connection unit is low, controls the fixing unit to fix the storage battery pack to the connection unit, and when the power storage amount of the storage battery pack is high, controls the fixing unit to release the fixing of the storage battery pack to the connection unit.

Thus, it is possible to suppress the storage battery pack from being erroneously detached from the connection unit during charging.

Hereinafter, embodiments will be described in detail using the drawings. It should be noted that the embodiments described hereinafter both represent comprehensive or specific examples. The numerical values, the shapes, the constituent elements, the arrangement positions and modes of connection of the constituent elements, the processing steps, the order of the steps, and the like given in the following embodiments are examples. Consequently, the present disclosure is not limited by these modes. Furthermore, constituent elements that are not mentioned in the independent claims indicating the most significant concepts of the present disclosure from among the constituent elements in the embodiments hereinafter are described as optional constituent elements.

Furthermore, the drawings are schematic views and are not always depicted in an exact manner. Moreover, in the drawings, configurations that are substantially the same are denoted by the same reference symbols, and redundant descriptions may be omitted or simplified.

Embodiment 1

[Configuration of Storage Battery Pack]

Figure 2:
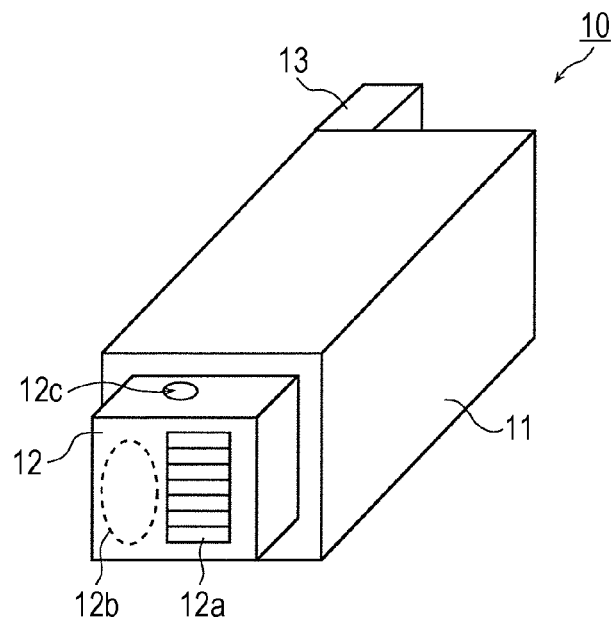
FIG. 2 is an external view in which the storage battery pack according to embodiment 1 is seen from a bottom surface side.

A storage battery housing device of embodiment 1 will be described. First, a configuration of a storage battery pack will be described. FIG. 1 is an external view in which the storage battery pack according to embodiment 1 is seen from the front surface side. FIG. 2 is an external view in which the storage battery pack according to embodiment 1 is seen from the bottom surface side.

As depicted in FIGS. 1 and 2, a storage battery pack 10 includes a main body unit 11, an attachment unit 12, a holding unit 13, a first display unit 14, and a charge amount display button 15.

The storage battery pack 10 is detachably connected to an electrical device, and is used as a direct-current power source for the electrical device. The electrical device to which the storage battery pack 10 is connected is an electric automobile (example of an electric vehicle), for example, but is not particularly limited. Furthermore, the storage battery pack 10 may be standardized so as to be able to be connected to a plurality of types of devices having different functions (uses).

The main body unit 11 is a casing that accommodates one storage battery pack 10 or more and a control unit for charging and discharging one storage battery pack 10 or more. Furthermore, the main body unit 11 may also accommodate a communication unit for outputting information of the storage battery pack 10 through a communication terminal (terminal included in a terminal unit 12a described later on).

The information of the storage battery pack 10 includes information indicating the state of the storage battery pack 10, for example. A possible example of information indicating the state of the storage battery pack is abnormality history information such as a charge amount, a voltage, a temperature, a number of charging/discharging cycles, a temperature abnormality, a current abnormality, a voltage abnormality, and an impact abnormality. Furthermore, the information of the storage battery pack 10 may include identification information of the storage battery pack 10, and the identification information of the storage battery pack 10 may be output through the communication terminal.

The main body unit 11 has a substantially rectangular cuboid form in embodiment 1; however, it should be noted that the shape of the main body unit 11 is not particularly limited. Moreover, the control unit and the communication unit may be realized by dedicated circuits, and may be realized by a processor, a microcomputer, or the like.

The attachment unit 12 is a connection interface that is provided on the bottom surface of the main body unit 11, and is attached to the electrical device for which the storage battery pack 10 is to operate as a power source. That is, the attachment unit 12 is a structure (shape and size) that can be attached to the electrical device. Specifically, the attachment unit 12 includes the terminal unit 12a, a wireless communication unit 12b, and an opening 12c.

The terminal unit 12a is made up of a plurality of terminals. These plurality of terminals are metal terminals used for electrically connecting the storage battery pack 10 and the electrical device for which the storage battery pack 10 is to operate as a power source. In embodiment 1, the terminal unit 12a includes a positive-pole terminal and a negative-pole terminal for charging the storage battery pack 10, and a positive-pole terminal and a negative-pole terminal for discharging the storage battery pack 10. Furthermore, a communication terminal may also be included.

The wireless communication unit 12b is an example of a first wireless communication unit, is a communication unit for short-distance wireless communication provided inside the attachment unit 12, and, specifically, is a near field communication (NFC) tag; however, the wireless communication unit 12b is not particularly limited. Moreover, the wireless communication unit 12b may be provided in the main body unit 11.

Furthermore, the opening 12c is an opening through which a lock pin of the storage battery housing device described later on is inserted, and is provided on a side surface of the attachment unit 12. The lock pin is inserted through the opening 12c during charging the storage battery pack 10. Thus, the storage battery pack 10 during charging cannot detach from the storage battery housing device.

The holding unit 13 is a handle that is gripped by the user in order to carry the storage battery pack 10. The holding unit 13 is provided on the top surface of the main body unit 11.

The first display unit 14 is an example of a light-emitting display unit, and displays the charge amount (hereinafter, also referred to as a remaining charge amount, a power storage amount, or the like) of a storage battery of the storage battery pack 10. The first display unit 14 is made up of three light emitting diodes (LEDs) in embodiment 1. LEDs of a number corresponding to the charge amount light up when the user has pressed the charge amount display button 15 or while the storage battery pack 10 is being charged by the storage battery housing device. The first display unit 14 is provided on the front surface (side surface) of the main body unit 11. It should be noted that it is also possible for the first display unit 14 to display information indicating the occurrence of an abnormality of the storage battery pack 10 or the deterioration of the storage battery pack 10 by causing the LEDs to blink or using a split display (a display method in which only the LED positioned in the central portion is made to emit light or not emit light). Here, an example of information indicating deterioration of the storage battery pack 10 is information indicating that the storage battery pack 10 has deteriorated, information indicating the degree of deterioration of the storage battery pack 10, or the like. For information indicating the degree of deterioration of the storage battery pack 10, a character, a numeral, or a symbol indicating the state of health (SOH), internal resistance, or the degree of deterioration is used, or an indicator indicating the degree of deterioration is used, for example. It should be noted that the SOH is indicated by the full charge capacity at that time or the initial full charge capacity, for example.

The charge amount display button 15 is a hardware button that the user presses in order to light up the first display unit 14. The charge amount display button 15 is provided on the front surface (the same side surface as the side surface on which the first display unit 14 is provided) of the main body unit 11.

[Configuration of Storage Battery Housing Device]

Figure 3:
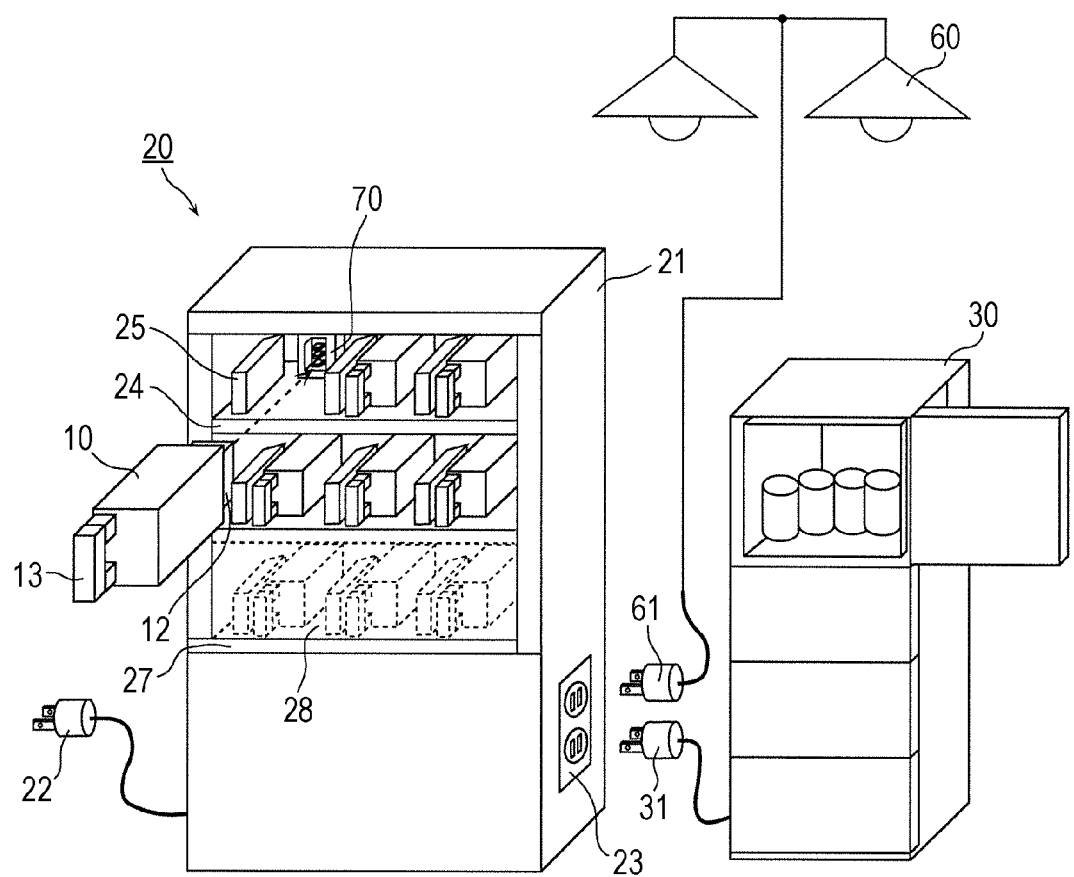
FIG. 3 is an external view (schematic view) of a storage battery housing device according to embodiment 1.
Figure 4:
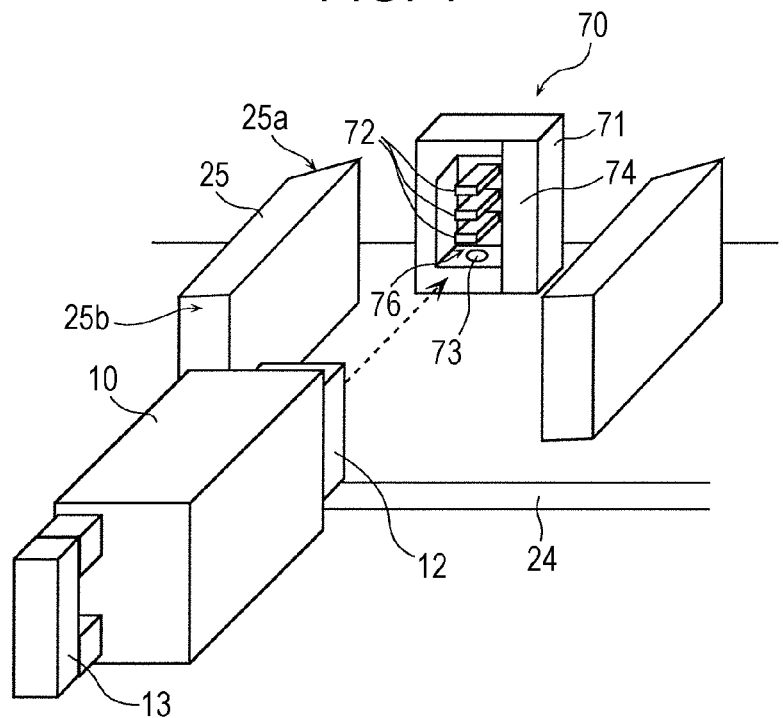
FIG. 4 is a partial enlarged view (enlarged view of the vicinity of a connection unit) of the storage battery housing device according to embodiment 1.

Next, the configuration of the storage battery housing device according to embodiment 1 will be described. FIG. 3 is an external view (schematic view) of the storage battery housing device according to embodiment 1. FIG. 4 is a partial enlarged view (enlarged view of the vicinity of a connection unit) of the storage battery housing device according to embodiment 1.

As depicted in FIG. 3, a storage battery housing device 20 includes: a casing 21 that includes a plurality of shelves including a shelf 24 and a shelf 27; a power reception plug 22; a socket 23; a second display unit 25; a connection unit 70; and a cover 28. It should be noted that the casing 21 should include at least one shelf. Furthermore, the socket 23, the second display unit 25, and the cover 28 are not essential constituent elements.

The storage battery housing device 20 accommodates a plurality of storage battery packs 10, and includes a function to charge these plurality of storage battery packs 10. That is, the storage battery housing device 20 functions as a charging device for the storage battery packs 10. Furthermore, it is also possible for the storage battery housing device 20 to supply alternating-current power to other electrical devices (a refrigerator 30 and an illumination device 60, for example) through the socket 23.

The storage battery housing device 20 is used in a rental business for the storage battery packs 10, for example. At such time, the storage battery housing device 20 is installed in a convenience store, outdoors, or the like, charges the plurality of storage battery packs 10, which are to be rented, and is housed inside the casing 21.

Furthermore, the storage battery housing device 20 may also have a function as a backup power source that, in place of an external power source, supplies power to an external electrical device when the external power source has a power failure as described later on.

The casing 21 has a substantially rectangular cuboid form that includes a plurality of shelves, including the shelves 24 and 27, on which the storage battery packs 10 are respectively placed. In other words, the casing 21 is a locker that accommodates the storage battery packs 10. A portion of the front surface of the casing 21 is open, and it is possible for the storage battery packs 10 to be accommodated in the casing 21 and for the storage battery packs 10 to be removed from the casing 21 through the open portion. The surfaces of the shelves 24 and 27 on which the storage battery packs 10 are placed are level or sloped downward but not vertically downward. That is, the shelves 24 and 27 may have either form provided it is possible for the storage battery packs 10 to be placed thereon.

The shelves 24 and 27 have the plurality of storage battery packs 10 placed thereon, and divide the space inside the casing 21. The plurality of storage battery packs 10 placed on the shelf 24 are easy to remove from the casing 21 of the storage battery packs 10 when to be rented in the aforementioned rental business.

In contrast, the plurality of storage battery packs 10 placed on the shelf 27 are covered by the cover 28 at the front side of the shelf 27 (front surface side of the casing 21), and are therefore harder to remove than the plurality of storage battery packs 10 placed on the shelf 24. This is because the plurality of storage battery packs 10 placed on the shelf 27 are used as emergency power sources and are not to be rented.

The connection unit 70 is a connection interface provided in plurality at the rear of the shelf 24 (or the shelf 27), to which the storage battery packs 10 are detachably, electrically, and mechanically connected. As depicted in FIG. 4, the connection unit 70 includes a connection unit main body 71, a plurality of terminals 72, a lock pin 73, and a wireless communication unit 74. In FIG. 4, the connection unit 70 is arranged on the shelf 24; however, it should be noted that the connection unit 70 may be provided at the rear of the shelf, and, for example, may be arranged on an inner wall (sidewall) of the casing 21 positioned at the rear of the shelf 24.

The connection unit main body 71 is a member having a substantially rectangular cuboid form, and a recess 76 into which the attachment unit 12 is inserted is provided in the connection unit main body 71. The recess 76 extends from the front side of the shelf 24 to the rear side.

Thus, the user can easily insert the attachment unit 12 into the recess 76 by pushing the storage battery pack 10 in question from the front side to the rear side in a state in which the bottom surface side (attachment unit 12) of the storage battery pack 10 is facing the rear side of the shelf 24. Furthermore, in a state in which the attachment unit 12 has been inserted into the recess 76, the user can easily remove the attachment unit 12 from the recess 76 by merely pulling the storage battery pack 10 along the shelf. It should be noted that, in a state in which the attachment unit 12 has been inserted into the recess 76, one side surface of the storage battery pack 10 and the shelf 24 (or the shelf 27) abut (make surface contact), and the front surface (side surface perpendicular to the aforementioned one side surface, on which the first display unit 14 is provided) of the storage battery pack 10 opposes the second display unit 25 to the side.

Furthermore, due to the connection unit 70 being provided at the rear of the shelf 24, an effect is obtained in that it is difficult for foreign substances such as dust to collect inside the recess 76. That is, due to the connection unit 70 being provided at the rear of the shelf 24, it is possible to suppress the occurrence of connection faults or the like between the terminals 72 and the terminal unit 12a. In particular, in the case where the recess 76 extends from the front side of the shelf 24 toward the rear side as in embodiment 1, the effect of it being difficult for foreign substances such as dust to collect is more prominent than in the case where the recess 76 extends from the upper side to the lower side in the vertical direction.

The plurality of terminals 72 are metal terminals provided on the bottom surface that forms the recess of the connection unit main body 71. The plurality of terminals 72 are electrically and mechanically connected to the terminal unit 12a provided in the storage battery pack 10. Specifically, the plurality of terminals 72 include a positive-pole terminal and a negative-pole terminal for charging the storage battery pack 10, a positive-pole terminal and a negative-pole terminal for discharging the storage battery pack 10, a communication terminal, and the like. From there among, the communication terminal is an example of an acquirer. It should be noted that the number of the plurality of terminals 72 depicted in the drawing is an example, and the number of the plurality of terminals 72 is not particularly limited.

The plurality of the terminals 72 correspond to the terminal unit 12a of the storage battery pack 10, and abut the terminal unit 12a in a state in which the attachment unit 12 of the storage battery pack 10 is attached to the connection unit 70. Thus, when the plurality of terminals 72 are electrically connected to the terminal unit 12a, it becomes possible to charge the storage battery pack 10 by at least the storage battery housing device 20. Furthermore, the terminals 72 may include a terminal that makes it possible to discharge from the storage battery pack 10. Furthermore, the terminals 72 may include a communication terminal that makes it possible to communicate with the storage battery pack 10.

Figure 5:
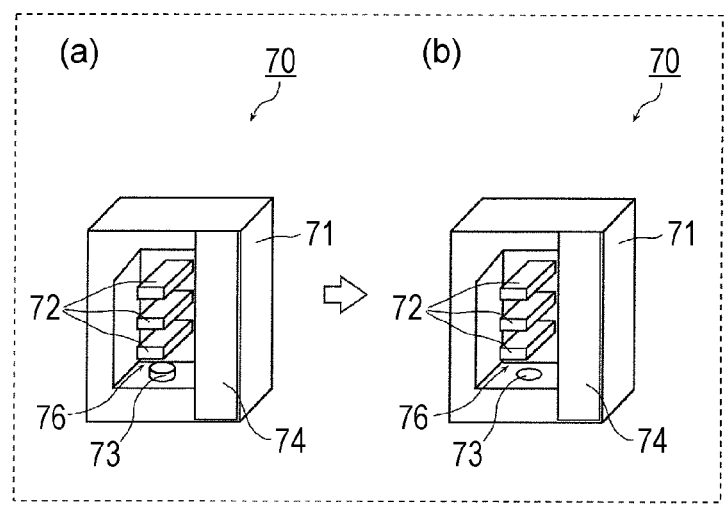
FIG. 5 is a drawing for describing an operation of a lock pin.

The lock pin 73 is an example of a fixing unit, and is a cylindrical member that protrudes from a side surface (sidewall) that forms the recess 76. FIG. 5 is a drawing for describing an operation of the lock pin 73.

For example, when the power storage amount of the storage battery pack 10 connected to the connection unit 70 is low, the storage battery pack 10 is fixed to the connection unit 70 by the lock pin 73. Specifically, the lock pin 73 protrudes from the side surface that forms the recess 76 (FIG. 5(*a*)), and is inserted into the opening 12c of the storage battery pack 10. Furthermore, when there are many storage battery packs 10 connected to the connection units 70, the fixing of the storage battery packs 10 to the connection units 70 implemented by the lock pins 73 is released. Specifically, the lock pin 73 is accommodated inside the connection unit main body 71 (FIG. 5(*b*)).

It should be noted that whether the power storage amount of the storage battery pack 10 is high or low may be determined using a prescribed threshold value. Specifically, when the power storage amount of the storage battery pack 10 is less than the prescribed threshold value, the storage battery pack 10 is fixed by the lock pin 73, and when the power storage amount is equal to or greater than the prescribed threshold value, the fixing of the storage battery pack 10 implemented by the lock pin 73 is released. Here, the prescribed threshold value is defined as a power storage amount with which it is possible for the storage battery pack 10 to be rented, for example. The prescribed threshold value may be a value that corresponds to a full charge amount, and may be a value that corresponds to 90% of the full charge amount, for example.

As described hereinabove, due to the lock pin 73, it is possible to suppress the storage battery pack 10 from being erroneously detached from the connection unit 70 during charging. Moreover, the lock pin 73 may fix the storage battery pack 10 to the connection unit 70 during discharge of the storage battery pack 10. Furthermore, this kind of control of the lock pin 73 is performed by a control unit described later on. It should be noted that the lock pin 73 is not an essential constituent element for the storage battery housing device 20.

The wireless communication unit 74 is an example of an acquirer and a second wireless communication unit and, in a state in which the attachment unit 12 of the storage battery pack 10 is attached to the connection unit 70, is provided in a position opposing the wireless communication unit 12b of the storage battery pack 10, and communicates with the wireless communication unit 12b. Specifically, the wireless communication unit 74 is an NFC reader, and acquires identification information of the storage battery pack 10. An example of the identification information is information such as an ID number, a manufacturing date, or a manufacturing location of the storage battery pack 10. Furthermore, information indicating the state of the storage battery pack 10 may be acquired from the wireless communication unit 12b included in the storage battery pack 10. It should be noted that the wireless communication unit 74 is not an essential constituent element for the storage battery housing device 20.

As in embodiment 1, the wireless communication unit 74 is provided at the rear of the shelf 24 as part of the connection unit 70; however, it should be noted that the wireless communication unit 74 may be arranged in any manner provided it is possible to perform short-distance wireless communication with the wireless communication unit 12b. It should be noted that the information indicating the state of the storage battery pack 10 includes the charge amount of the storage battery pack 10, information indicating an abnormality of the storage battery pack 10, information indicating the lifespan of the storage battery pack 10, or the like. Here, an example of the information indicating the lifespan of the storage battery pack 10 is information indicating the remaining lifespan of the storage battery pack 10, information indicating that the storage battery pack 10 has reached the lifespan, or the like. It should be noted that such information is generated by a control unit inside the storage battery pack 10.

Furthermore, the information indicating the state of the storage battery pack 10 may be a current value or a voltage value during charging or discharging of the storage battery pack 10, and may be dynamically acquired during charging or discharging of the storage battery pack 10. In such case, a determination as to whether there is an abnormality in the storage battery pack 10 is performed at the storage battery housing device 20 side. Specifically, the determination as to whether there is an abnormality in the storage battery pack 10 is performed by a control unit described later on, for example.

The power reception plug 22 is an example of a power reception unit, and is connected to an external power source and receives power from the external power source. An example of the external power source is a power system, a solar battery, a fuel cell, or the like. It should be noted that, in the storage battery housing device 20, the power reception plug 22 is provided on a side surface of the casing 21, as depicted in FIG. 3.

The socket 23 is an example of a power supply unit, and has the external electrical device connected thereto in order to supply the external electrical device with power of the storage battery pack 10 discharged by a discharging control circuit that is described later on. In the example of FIG. 3, the socket 23 is provided on the side surface on the opposite side to the side surface of the casing 21 on which the power reception plug 22 is provided, and a power source plug 31 of the refrigerator 30, a power source plug 61 of the illumination device 60, or the like is connected to the socket 23.

It should be noted that a power supply unit other than the socket 23, such as a USB connector (USB port), may be provided in the storage battery housing device 20. Furthermore, a wireless power supply module that supplies power in a non-contact manner may be provided as a power supply unit in the storage battery housing device 20. Specifically, the wireless power supply module includes a power supply coil or the like.

The second display unit 25 is an example of a display unit, is provided on the shelf 24, and reflects and projects information indicating the state of the storage battery pack 10 displayed on a side surface of the storage battery pack 10, toward the front of the shelf 24. In the present example, specifically, the second display unit 25 displays the state of the storage battery pack 10 at the front side of the shelf 24 by guiding light emitted by the first display unit 14 of the storage battery pack 10, to the front side of the shelf 24 (front surface side of the casing 21). FIG. 6 is a drawing (top view) for describing the light guiding performed by the second display unit 25.

The second display unit 25 is a plate-shaped member equipped with a light-guiding function, provided in a position corresponding to the first display unit 14 included in the storage battery pack 10 placed on the shelf 24. Specifically, the plate-shaped member is a light guide plate. The second display unit 25 is provided in plurality on one shelf 24. Specifically, the second display unit 25 is formed of an acrylic resin, but may be formed of any kind of material such as another resin material that is transparent.

As depicted in FIG. 6, light emitted by the first display unit 14 is reflected by a reflecting surface 25a provided at one end of the second display unit 25 (rear end of the shelf 24), and exits from a light-exiting surface 25b provided at the other end of the second display unit 25 (front side of the shelf 24).

Figure 7A:
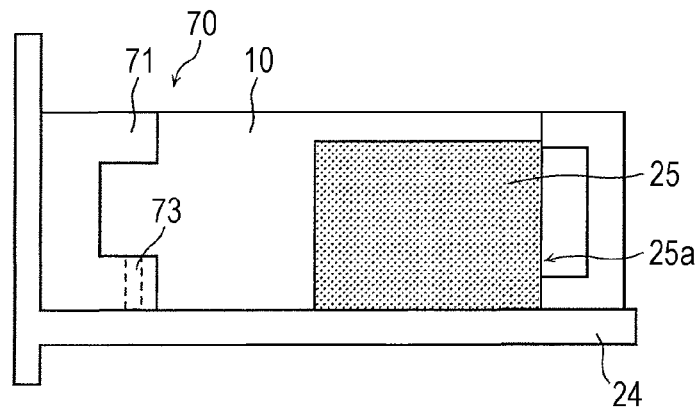
FIG. 7A is a first schematic view depicting a light emission mode of the second display unit.
Figure 7B:
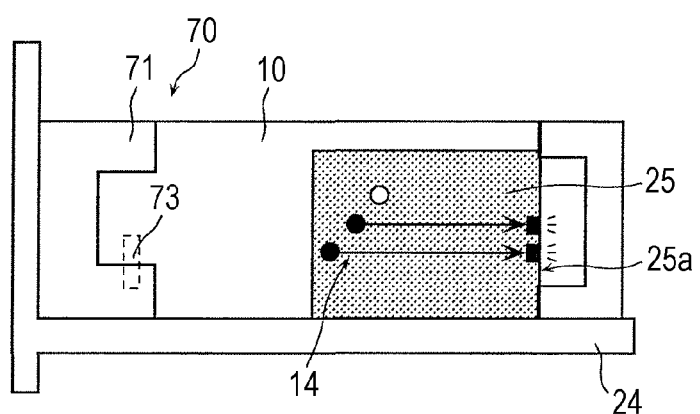
FIG. 7B is a second schematic view depicting a light emission mode of the second display unit.
Figure 7C:
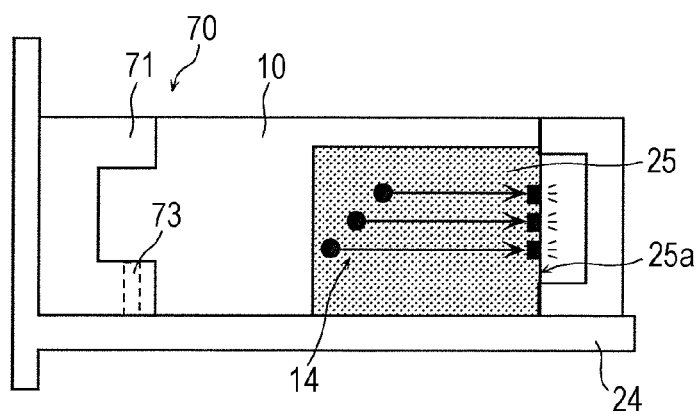
FIG. 7C is a third schematic view depicting a light emission mode of the second display unit.

As described above, LEDs of a number corresponding to the charge amount light up in the second display unit 25. Consequently, a light emission region increases in accordance with the charge amount in the light-exiting surface 25b as well. FIGS. 7A to 7C are schematic views depicting light emission modes of the second display unit 25.

When the storage battery pack 10 having a decreased charge amount is connected to the connection unit 70 in the state depicted in FIG. 7A, the lock pin 73 is inserted into the opening 12c of the storage battery pack 10 as depicted in FIG. 7B, and charging is started. At such time, a light emission region is formed in accordance with the charge amount in the light-exiting surface 25b. In the example of FIG. 7B, light emission regions are formed in two locations.

When the charge amount of the storage battery pack 10 becomes equal to or greater than a prescribed threshold value, the fixing of the storage battery pack 10 implemented by the lock pin 73 is released as depicted in FIG. 7C, and charging ends. Here, a state in which the charge amount is equal to or greater than the prescribed threshold value is a full charge state, for example. At such time, light emission regions indicating a full charge are formed in the light-exiting surface 25b. In the example of FIG. 7C, light emission regions are formed in three locations.

As described above, it is possible for the second display unit 25 to easily display the charge amount using the first display unit 14 of the storage battery pack 10.

It should be noted that, as described above, it is also possible for the first display unit 14 of the storage battery pack 10 to display an abnormality of the storage battery pack 10 or the degree of deterioration of the storage battery pack 10 by blinking of the LEDs or the like. Consequently, it is also possible for the second display unit 25 to display that an abnormality has occurred in the storage battery pack 10 and the degree of deterioration of the storage battery pack 10.

It should be noted that, in embodiment 1, the second display unit 25 also functions as a separator for storage battery packs 10 placed on the shelf 24. That is, in the casing 21, the storage battery packs 10 are placed among a plurality of second display units 25 provided on the shelf 24. Moreover, the second display units 25 may be used as guides when the storage battery packs 10 are pushed in.

It should be noted that it is possible for the second display unit 25 to display information indicating the state of the storage battery pack 10 displayed on the first display unit 14, even in a mode in which the first display unit 14 of the storage battery pack 10 does not emit light. This is because, when the front of the shelf 24 of the storage battery housing device 20 is open, the display content of the first display unit 14 is projected to the second display unit 25 by external light.

[Functional Configuration of Storage Battery Housing Device]

Figure 8:
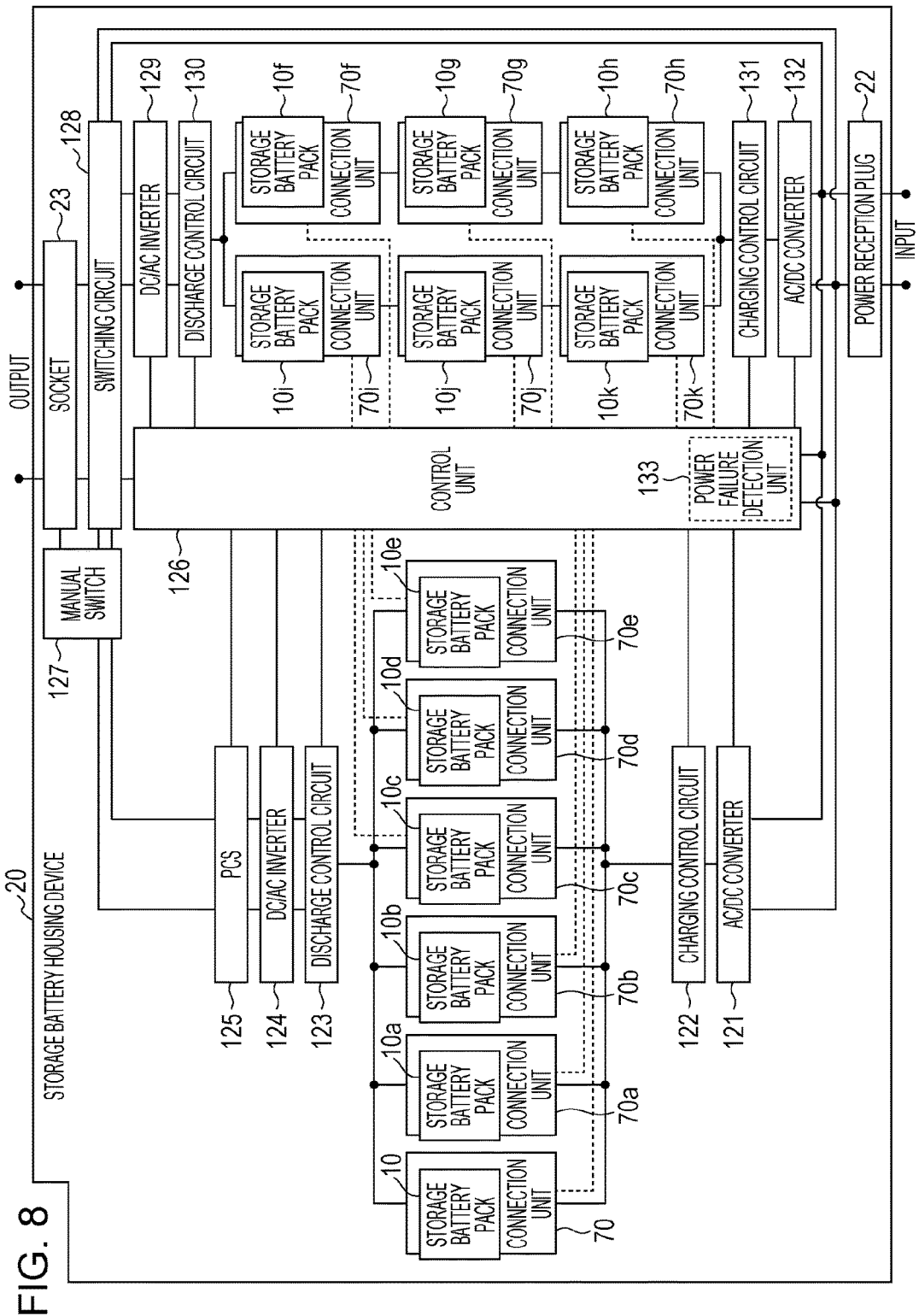
FIG. 8 is a block diagram depicting a functional configuration of the storage battery housing device according to embodiment 1.

Next, a functional configuration of the storage battery housing device 20 will be described. FIG. 8 is a block diagram depicting a functional configuration of the storage battery housing device 20. It should be noted that the plurality of storage battery packs 10, 10a to 10k depicted in FIG. 8 all have the same specifications as the aforementioned storage battery pack 10. The dashed lines connecting each of the plurality of connection units 70, 70a to 70k to a control unit 126 in FIG. 8 are lines indicating communication via the terminals 72 or communication via the wireless communication unit 74.

As depicted in FIG. 8, the storage battery housing device 20 may include the two types of connection units of the connection units 70, 70a to 70e, which connect a plurality of storage battery packs in parallel, and the connection units 70f to 70k, which connect a plurality of storage battery packs in series. Furthermore, the storage battery housing device 20 may include a discharge control circuit 123 and a switching circuit 128.

First, the plurality of connection units included in the storage battery housing device 20 will be described. The storage battery housing device 20 includes the plurality of connection units 70, 70a to 70k, which each have a storage battery pack connected thereto. It should be noted that the connection units 70a to 70k have the same specifications as the aforementioned connection unit 70.

In FIG. 8, the connection units 70, 70a to 70e are an example of a plurality of first connection units, and are provided on the aforementioned shelf 24. That is, the storage battery packs 10, 10a to 10e, which are to be rented, are detachably connected to the connection units 70, 70a to 70e. In contrast, the connection units 70f to 70k are an example of a plurality of second connection units, are provided on the aforementioned shelf 27, and are covered by the cover 28. That is, the connection units 70f to 70k are arranged inside the casing 21 in positions where it is more difficult for the storage battery packs to be attached and detached compared to the connection units 70, 70a to 70e. This is because the connection units 70f to 70k are used as emergency power sources when there is a power failure or the like, and have the storage battery packs 10f to 10k, which are not to be rented, connected thereto.

It should be noted that these storage battery packs 10f to 10k are in principle not removed from the storage battery housing device 20. Consequently, it is not necessary to improve the ability to attach and remove the storage battery packs 10f to 10k, and therefore it is not absolutely necessary for the connection units 70f to 70k to be provided at the rear of the shelf 27.

In this way, it is essentially not possible to attach and detach the storage battery packs 10f to 10k connected to the connection units 70f to 70k. Here, attachment and detachment being essentially not possible means that the user cannot easily attach and detach the storage battery packs 10f to 10k (difficult to attach and detach), and does not mean that attachment and detachment is completely impossible.

Here, as depicted in FIG. 8, the electrical connection mode among the connection units 70, 70a to 70e is different from the electrical connection mode among the connection units 70f to 70k.

The connection units 70, 70a to 70e constitute a first electrical circuit in which the plurality of storage battery packs 10, 10a to 10e connected to these connection units 70, 70a to 70e are connected in parallel. As described above, this is because the storage battery packs 10, 10a to 10e are to be rented, and the frequency at which they are charged is higher than the frequency at which they are discharged and thus emphasis is placed on charging.

In contrast, the connection units 70f to 70h and the connection units 70i to 70k constitute a second electrical circuit in which the plurality of storage battery packs 10f to 10h connected to the connection units 70f to 70h are connected in series and the storage battery packs 10i to 10k connected to the connection units 70i to 70k are connected in series. As described above, it is assumed that the storage battery packs 10f to 10h (storage battery packs 10i to 10k) are used as emergency power sources, and are connected in series in order to increase the output voltage and increase the efficiency of conversion into an alternating-current power.

In this way, in the storage battery housing device 20, a plurality of connection units having the same specifications are used to respond to two uses (rental use and emergency power source use). Thus, a reduction in component costs is realized. Furthermore, it is not necessary to implement a separate design for an emergency power source, and therefore design costs can be reduced (simplifying the design).

Next, constituent elements used for the charging and discharging of the storage battery packs 10, 10a to 10k will be described. The storage battery housing device 20 includes AC/DC converters 121 and 132, charging control circuits 122 and 131, discharging control circuits 123 and 130, DC/AC inverters 124 and 129, a power conditioning system (PCS) 125, a control unit 126, a manual switch 127, and the switching circuit 128.

The AC/DC converter 121 converts alternating-current power obtained through the power reception plug 22 into direct-current power, and outputs the direct-current power to the charging control circuit 122. Similarly, the AC/DC converter 132 converts alternating-current power obtained through the power reception plug 22 into direct-current power, and outputs the direct-current power to the charging control circuit 131.

The charging control circuit 122 is an example of a charging unit, and uses power received by the power reception plug 22 to charge the storage battery packs 10, 10a to 10e connected to the connection units 70, 70a to 70e. Specifically, the charging control circuit 122 uses the direct-current power output from the AC/DC converter 121 to charge the storage battery packs 10, 10a to 10e connected to the connection units 70, 70a to 70e, via the connection units 70, 70a to 70e. Similarly, the charging control circuit 131 is an example of a charging unit, and uses the direct-current power output from the AC/DC converter 132 to charge the storage battery packs 10f to 10k connected to the connection units 70f to 70k, via the connection units 70f to 70k.

The discharging control circuit 123 is an example of a discharging unit, and discharges the storage battery packs 10, 10a to 10e connected to the connection units 70, 70a to 70e, via the connection units 70, 70a to 70e, and outputs direct-current power obtained by the aforementioned discharging, to the DC/AC inverter 124. Similarly, the discharging control circuit 130 is an example of a discharging unit, and discharges the storage battery packs 10f to 10k connected to the connection units 70f to 70k, via the connection units 70f to 70k, and outputs direct-current power obtained by the aforementioned discharging, to the DC/AC inverter 129.

The DC/AC inverter 124 converts the direct-current power output from the discharging control circuit 123 into alternating-current power, and outputs the alternating-current power to the PCS 125. The PCS 125 further converts the alternating-current power output from the DC/AC inverter 124 into alternating-current power that is the same as system power and outputs to the switching circuit 128. Similarly, the DC/AC inverter 129 converts the direct-current power output from the discharging control circuit 130 into alternating-current power, and outputs the alternating-current power to the switching circuit 128.

The switching circuit 128 is an example of a switching unit, and switches the supply source for the alternating-current power that is output to the socket 23. Specifically, the switching circuit 128 switches between: supplying the external electrical device connected to the socket 23 with alternating-current power that is supplied to the power reception plug 22 from the external power source; and supplying the external electrical device connected to the socket 23 with power by discharging the storage battery packs 10f to 10k connected to the connection units 70f to 70k, by way of the discharging control circuit 130. Specifically, the switching circuit 128 is configured from a FET or a relay element. In embodiment 1, the switching circuit 128 is controlled by the control unit 126; however, it should be noted that the switching circuit 128 may be a hardware switch with which switching can be performed manually by the user.

It should be noted that it is also possible for the switching circuit 128 to supply power to the external electrical device connected to the socket 23, by discharging the storage battery packs 10, 10a to 10e connected to the connection units 70, 70a to 70e, by way of the discharging control circuit 123. However, charging is ordinarily performed for the storage battery packs 10, 10a to 10e, and therefore it is assumed that this kind of switching is not necessary. Therefore, the manual switch 127 may be provided between the PCS 125 and the switching circuit 128.

The manual switch 127 is a hardware switch with which an electrical connection between the discharging control circuit 123 (PCS 125) and the switching circuit 128 is turned on or off. In the case where it is not necessary to supply power to the socket 23 on the basis of the discharging performed by the discharging control circuit 123 as described above, the electrical connection between the discharging control circuit 123 and the switching circuit 128 can be turned off (disconnected) by the user with the manual switch 127.

The control unit 126 performs control for the aforementioned AC/DC converters 121 and 132, the charging control circuits 122 and 131, the discharging control circuits 123 and 130, the DC/AC inverters 124 and 129, the PCS 125, and the switching circuit 128. For the control unit 126, an element that has a control function is sufficient. The control unit 126 includes a calculation processing unit (not depicted) and a storage unit (not depicted) that stores a control program. A possible example of the calculation processing unit is an MPU or a CPU. A possible example of the storage unit is a hard disk or a semiconductor memory. The control unit 126 may be constituted by an individual control unit that performs centralized control, and may be constituted by a plurality of control units that cooperate with each other to perform distributed control.

[Control Performed by Control Unit]

The control unit 126 may perform charging control and discharging control for the storage battery pack 10. Furthermore, the control unit 126 may perform switching control using the switching circuit 128. Hereinafter, control performed by the control unit 126 will be described. First, charging control will be described.

The control unit 126 performs charging control for the storage battery pack 10 using the charging control circuit 122 (or the charging control circuit 131) on the basis of information acquired through the wireless communication unit 74 or the terminals 72 of the connection unit 70.

For example, the control unit 126 performs control that lowers a current value during charging in the case where the voltage value and the current value of the storage battery pack 10 obtained through the terminals 72 are outside of a prescribed range and it is determined that the storage battery pack 10 has deteriorated. It should be noted that the case where it is determined that the storage battery pack 10 has deteriorated refers to the case where it is determined that an internal resistance of the storage battery pack 10 has become equal to or greater than a prescribed value on the basis of the voltage value and the current value, for example. According to this kind of charging control, it is possible to suppress deterioration of the storage battery pack 10.

Furthermore, for example, in the case where it is determined that the storage battery pack 10 has deteriorated, the control unit 126 performs control that increases the voltage value during charging in the final period of the charging period. According to this kind of charging control as well, it is possible to suppress deterioration of the storage battery pack 10.

Furthermore, for example, in the case where the wireless communication unit 74 has acquired information indicating that there is an abnormality in the storage battery pack 10 during charging of the storage battery pack 10, the control unit 126 performs control that stops the charging of the storage battery pack 10. According to this kind of charging control, it is possible to suppress the storage battery pack 10 becoming damaged or the like.

Next, discharging control performed by the control unit 126 will be described. The control unit 126 performs discharging control for the storage battery pack 10 using the discharging control circuit 123 (or the discharging control circuit 130) on the basis of information acquired through the wireless communication unit 74 or the terminals 72 of the connection unit 70.

For example, the control unit 126 performs control that lowers the current value during discharging and increases the discharging time in the case where the voltage value and the current value of the storage battery pack 10 obtained through the terminals 72 are outside of a prescribed range and it is determined that the storage battery pack 10 has deteriorated. According to this kind of discharging control, it is possible to suppress deterioration of the storage battery pack 10.

Furthermore, for example, in the case where it is determined that the storage battery pack 10 has deteriorated, the control unit 126 performs control that decreases the voltage value during discharging in the final period of the discharging period. According to this kind of discharging control as well, it is possible to suppress deterioration of the storage battery pack 10.

Furthermore, for example, in the case where the wireless communication unit 10 has acquired information indicating that there is an abnormality in the storage battery pack 10 during discharging of the storage battery pack 74, the control unit 126 performs control that stops the discharging of the storage battery pack 10. According to this kind of discharging control, it is possible to suppress the storage battery pack 10 becoming damaged or the like.

Figure 9:
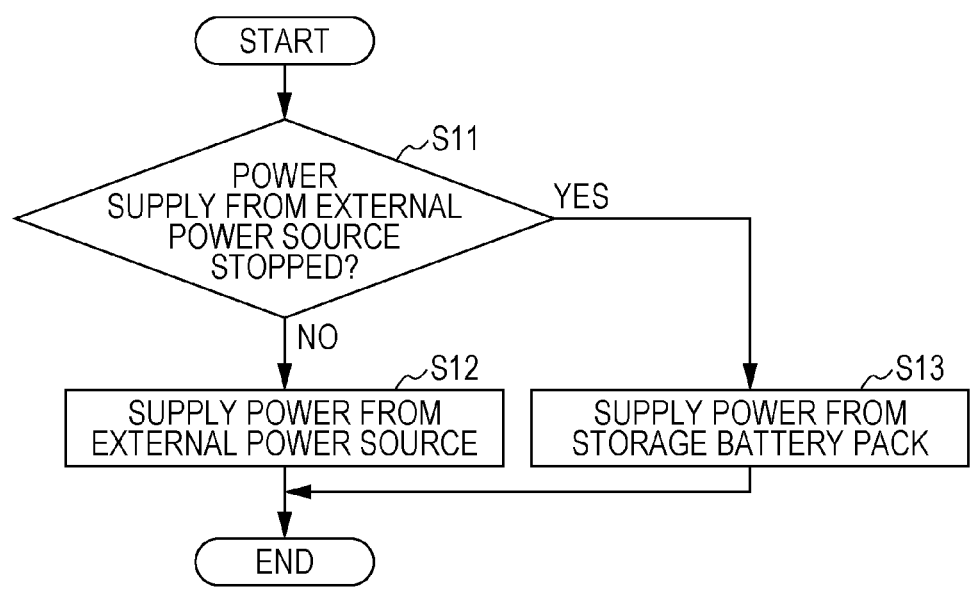
FIG. 9 is a flowchart of switching control performed by a control unit.

Next, switching control performed by the control unit 126 will be described. The control unit 126 includes a power failure detection unit 133 as depicted in FIG. 8. The power failure detection unit 133 detects whether or not power is being supplied from an external power source (power system) to the power reception plug 22. That is, the power failure detection unit 133 detects power failures. For example, the control unit 126 controls the switching circuit 128 on the basis of a detection result of the power failure detection unit 133. FIG. 9 is a flowchart of switching control performed by the control unit 126.

First, the power failure detection unit 133 detects whether or not the power supply from the external power source has stopped (S11). In the case where the power supply from the external power source has not stopped (no in S11), the control unit 126 uses the switching circuit 128 to supply power obtained from the external power source through the power reception plug 22, to the external electrical device connected as it is to the socket 23 (S12).

In the case where the power supply from the external power source has stopped (yes in S11), the control unit 126 uses the switching circuit 128 to supply power from the storage battery packs 10f to 10k to the external electrical device connected to the socket 23 (S13). Moreover, at such time, it is also possible for the control unit 126 to use the switching circuit 128 to supply power from the storage battery packs 10, 10a to 10e to the external electrical device connected to the socket 23.

According to this kind of switching control, the storage battery housing device 20 can continuously supply power through the socket 23 even when there is a power failure.

[Summary]

As described above, the storage battery housing device 20 includes the shelf 24 on which the storage battery pack 10 is placed, and the connection unit 70 that is provided at the rear of the shelf 24 and has the storage battery pack 10 detachably and electrically connected thereto. Thus, it is easy for the user to electrically and mechanically connect the storage battery housing device 20 and the storage battery pack 10 by merely pushing the storage battery pack 10 along the shelf into the storage battery housing device 20. Furthermore, in a state in which the storage battery housing device 20 and the storage battery pack 10 are connected, the user can easily detach the storage battery housing device 20 and the storage battery pack 10 by merely pulling the storage battery pack 10 along the shelf.

Furthermore, due to the connection unit 70 being provided at the rear of the shelf 24, an effect is obtained in that it is difficult for foreign substances such as dust to collect in the connection unit 70. Consequently, it is possible to suppress the occurrence of connection faults or the like between the storage battery housing device 20 (terminals 72) and the storage battery pack 10 (terminal unit 12a).

Embodiment 2

Figure 10:
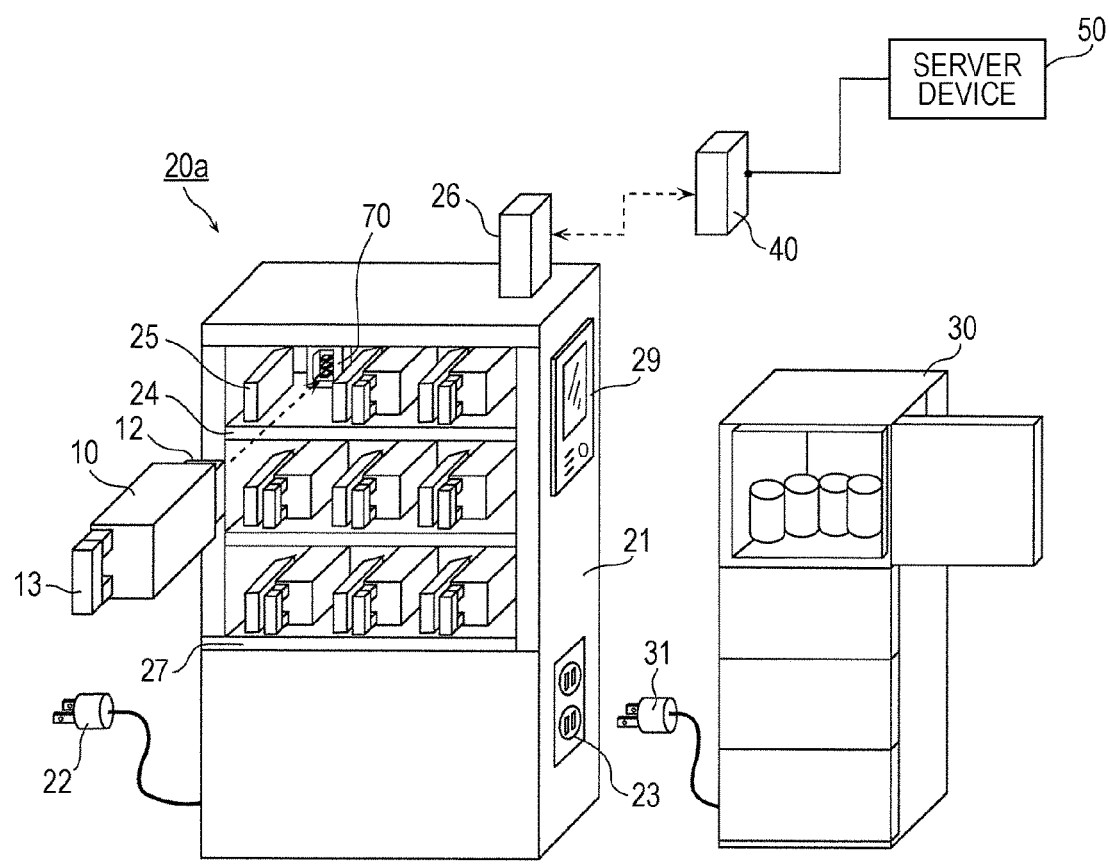
FIG. 10 is an external view (schematic view) of a storage battery housing device according to embodiment 2.

Hereinafter, a storage battery housing device according to embodiment 2 will be described. FIG. 10 is an external view (schematic view) of the storage battery housing device according to embodiment 2. It should be noted that, in embodiment 2 hereinafter, the differences with embodiment 1 will be mainly described, and descriptions of content that is substantially the same as in embodiment 1 may be omitted. Furthermore, the functional configuration of the storage battery housing device according to embodiment 2 is substantially the same as the configuration described in FIG. 8.

As depicted in FIG. 10, a storage battery housing device 20a is different from the storage battery housing device 20 in including a communication unit 26 and an image display unit 29. Moreover, the cover 28 is also not provided in the storage battery housing device 20a.

First, the communication unit 26 will be described. The communication unit 26 is an example of a communication unit, and communicates with an external server device 50. Specifically, the communication unit 26 is a communication circuit (communication module) or the like that communicates with the server device 50 via a server communication unit 40.

The server device 50 is a management server that manages identification information of the storage battery pack 10, information indicating the state of the storage battery pack 10, rental history, information of a user who has entered into a rental service agreement for the storage battery pack 10, and the like.

For example, the control unit 126 of the storage battery housing device 20a transmits information of the storage battery pack 10 acquired through the wireless communication unit 74 or the terminals 72, to the server device 50 using the communication unit 26. Thus, the server device 50 can manage the information of the storage battery pack 10. It should be noted that the information of the storage battery pack 10 is at least one of the identification information of the storage battery pack 10 and the information indicating the state of the storage battery pack 10, for example.

Furthermore, the communication unit 26 may receive information such as a charging instruction (or a discharging instruction) from the server device 50. Thus, the control unit 126 of the storage battery housing device 20a can perform charging control or discharging control in accordance with an instruction of the server device 50.

Furthermore, the communication unit 26 may function as a notification unit. For example, on the basis of information acquired through the wireless communication unit 74 or the terminals 72, an abnormality (information indicating an abnormality) of the storage battery pack 10 may be notified by the control unit 126 to the server device 50 via the communication unit 26. At such time, information indicating an abnormality of the storage battery pack 10 may be included in the information acquired through the wireless communication unit 74 or the terminals 72. Alternatively, the control unit 126 or the server device 50 may determine whether or not there is an abnormality in the storage battery pack 10 on the basis of information acquired through the wireless communication unit 74 or the terminals 72.

For example, the server device 50, which has received information indicating an abnormality of the storage battery pack 10, transmits the information indicating an abnormality of the storage battery pack 10 to an information communication terminal such as a smartphone or a PC provided in a store. The notification of an abnormality of the storage battery pack 10 via an information communication terminal is thereby realized. Moreover, the communication unit 26 may transmit information prompting use of the storage battery pack 10 to be stopped, directly to an information communication terminal.

Similarly, the communication unit 26, for example, may notify information prompting use of the storage battery pack 10 to be stopped, to outside (such as the server device 50) on the basis of information acquired through the wireless communication unit 74 or the terminals 72. At such time, the information prompting use of the storage battery pack 10 to be stopped may be included in the information acquired through the wireless communication unit 74 or the terminals 72. Alternatively, the control unit 126 or the server device 50 may determine whether or not to prompt use of the storage battery pack 10 to be stopped, on the basis of the information (information indicating an abnormality of the storage battery pack 10, for example) acquired through the wireless communication unit 74 or the terminals 72.

Furthermore, the communication unit 26, for example, may notify information indicating the lifespan of the storage battery pack 10 to an external device on the basis of the information acquired through the wireless communication unit 74 or the terminals 72 of the connection unit 70. The external device is the server device 50 or an information communication terminal, for example. At such time, information indicating the lifespan of the storage battery pack 10 may be included in the information acquired through the wireless communication unit 74 or the terminals 72. Alternatively, the control unit 126 or the server device 50 may determine the lifespan of the storage battery pack 10 on the basis of the information (the number of charging/discharging cycles, for example) acquired through the wireless communication unit 74 or the terminals 72.

Next, the image display unit 29 will be described. The image display unit 29 is an example of a display unit (or a notification unit), and displays the state of the storage battery pack 10. The image display unit 29 is a display device that is constituted by a liquid crystal panel, an organic EL panel, or the like, and displays video and still images, for example. It should be noted that the image display unit 29 may include a touch panel and function as an input interface for the user to give instructions to the storage battery housing device 20a.

Information of the storage battery pack 10 is displayed as an image on the image display unit 29. The information of the storage battery pack is at least one of the identification information of the storage battery pack 10 and the information indicating the state of the storage battery pack 10, for example. A possible example of the information indicating the state of the storage battery pack 10 is the charge amount of the storage battery pack 10, information indicating an abnormality of the storage battery pack 10, information indicating the lifespan of the storage battery pack 10, or the like. These items of information are acquired from the storage battery pack 10 through the wireless communication unit 74 or the terminals 72 of the connection unit 70, but may be generated by the control unit 126 on the basis of the voltage value and the current value of the storage battery pack 10 obtained through the terminals 72.

Furthermore, the information of the storage battery pack 10 may be acquired from the communication unit 26 by an information terminal device in accordance with an operation performed by the user, and the information may be displayed on a display screen of the information terminal device. For example, a list of a plurality of storage battery packs 10 may be displayed together with respective identification information on the display screen of the information terminal device, and specific information, information indicating a state, or the like of a storage battery pack 10 selected by the user may be displayed. Furthermore, the information of the storage battery pack 10 may be acquired from the communication unit 26 by the information terminal device in accordance with an operation performed by the user, and identification information of the plurality of storage battery packs 10 and information indicating the state of each storage battery pack may be associated and displayed as a list on the display screen of the information terminal device.

Other Embodiments

As described above, embodiments 1 and 2 have been described as exemplifications of the technology disclosed in the present disclosure. However, the technology in the present disclosure is not limited to the aforementioned and can also be applied to an embodiment in which an alteration, substitution, addition, omission or the like has been implemented as appropriate. Furthermore, it is also possible to combine the constituent elements described in the aforementioned embodiments 1 and 2 to obtain a new embodiment.

For example, in the aforementioned embodiments, the wireless communication unit 74 communicated with the wireless communication unit 12b in accordance with an NFC standard; however, the communication standard is not limited to NFC. Communication between the wireless communication unit 12b and the wireless communication unit 74 may be performed using a short-distance wireless communication standard such as Bluetooth (registered trademark) or ZigBee (registered trademark). That is, wireless communication between the wireless communication unit 74 and the wireless communication unit 12b may be in either mode provided it is short-distance wireless communication.

Furthermore, in the aforementioned embodiments, the second display unit 25, the communication unit 26, the image display unit 29, and the like were described as examples of a notification unit; however, the notification unit may be in any mode provided information can be externally notified. For example, the notification unit may be a sound-emitting device such as a speaker, and in such case, information is externally notified (to the periphery of the installation location of the storage battery housing device, for example) by sound.

Furthermore, in the example depicted in FIG. 8, the storage battery housing device includes connection units (connection units 70f to 70k) that connect a plurality of storage battery packs in series; however, the storage battery housing device does not have to include these connection units. The storage battery housing device may have a form in which power is supplied to an external electrical device from a plurality of storage battery packs connected to connection units (connection units 70, 70a to 70e) that connect the storage battery packs in parallel.

Furthermore, in the aforementioned embodiments, each constituent element (the control unit, for example) may be configured by using dedicated hardware, or may be realized by executing a software program suitable for each constituent element. Each constituent element may be realized by a program execution unit such as a CPU or a processor reading and executing a software program recorded in a recording medium such as a hard disk or a semiconductor memory.

Furthermore, the present disclosure may be realized as a system, a method, an integrated circuit, a computer program, or a recording medium such as a computer-readable CD-ROM, and may be realized by an arbitrary combination of a system, a method, an integrated circuit, a computer program, and a recording medium. For example, the present disclosure may be realized as a storage battery management system that includes a server device according to the aforementioned embodiments and a storage battery housing device according to the aforementioned embodiments. Furthermore, the present disclosure may be realized as a program executed by a control unit according to the aforementioned embodiments.

Furthermore, in each of the aforementioned embodiments, processing executed by a specific processing unit may be executed by a separate processing unit. Furthermore, the order of the plurality of processing may be altered, and the plurality of processing may be executed in parallel.

A storage battery housing device according to one or more aspects has been described heretofore on the basis of the embodiments; however, the present disclosure is not limited to these embodiments. Modes in which various modifications conceived by a person skilled in the art have been implemented in the present embodiments, and modes constructed by combining the constituent elements in different embodiments may also be included within the scope of one or more aspects provided they do not depart from the gist of the present disclosure.

The present disclosure can be used in a storage battery pack rental business or the like as a storage battery housing device with which storage battery packs can be easily attached and detached.

What is claimed is:

1. A storage battery housing device, comprising:
   a casing that includes a shelf on which a storage battery pack is placed;
   a connector that is provided at the rear of the shelf and has the storage battery pack detachably and electrically connected thereto;
   a power receiver that is connected to an external power source and receives power from the external power source; and
   a charger that uses the power received by the power receiver to charge, via the connector, the storage battery pack connected to the connector; and
   a first display that displays information indicating a state of the storage battery pack,
   wherein a second display is provided on the shelf, and causes the information indicating the state of the storage battery pack, which is displayed on the first display on a side surface of the battery pack, to be reflected and projected toward the front of the shelf for display on the second display.

2. The storage battery housing device according to claim 1, further comprising:

an acquirer that acquires information indicating a state of the storage battery pack from the storage battery pack; and control circuitry that, based on the information acquired by the acquirer, controls charging of the storage battery pack using the charger.

3. The storage battery housing device according to claim 1, further comprising:

a discharger that discharges, via the connector, the storage battery pack connected to the connector; and a power supplier that supplies, to an external electrical device, power of the storage battery pack discharged by the discharger.

4. The storage battery housing device according to claim 3, further comprising:

an acquirer that acquires information indicating a state of the storage battery pack from the storage battery pack; and control circuitry that, based on the information acquired by the acquirer, controls discharging of the storage battery pack using the discharger.

5. The storage battery housing device according to claim 1, further comprising:

an acquirer that acquires information indicating a state of the storage battery pack from the storage battery pack; and a notifier that, based on the information acquired by the acquirer, externally notifies an abnormality of the storage battery pack.

6. The storage battery housing device according to claim 1, further comprising:

an acquirer that acquires information indicating a state of the storage battery pack from the storage battery pack; and a notifier that, based on the information acquired by the acquirer, externally notifies information prompting use of the storage battery pack to be stopped.

7. The storage battery housing device according to claim 1, further comprising:

an acquirer that acquires information indicating a state of the storage battery pack from the storage battery pack; and a notifier that, based on the information acquired by the acquirer, externally notifies information indicating a lifespan of the storage battery pack.

8. The storage battery housing device according to claim 1, further comprising:

an acquirer that acquires information indicating a state of the storage battery pack from the storage battery pack;

a communicator that communicates with an external server device; and control circuitry that uses the communicator to transmit the information acquired by the acquirer to the server device.

9. The storage battery housing device according to claim 1, comprising:

an acquirer that acquires information of the storage battery pack from the storage battery pack, the acquirer being provided at the rear of the shelf.

10. The storage battery housing device according to claim 1, comprising:

an acquirer that acquires information of the storage battery pack, the acquirer being a terminal that is connected to a communication terminal provided in the storage battery pack.

11. The storage battery housing device according to claim 1, comprising:

an acquirer that acquires information of the storage battery pack, the acquirer being a second wireless communicator that performs short-distance wireless communication with a first wireless communicator provided in the storage battery pack.

12. The storage battery housing device according to claim 11, wherein the second wireless communicator performs short-distance wireless communication with the first wireless communicator in accordance with a near field communication (NFC) standard.

13. The storage battery housing device according to claim 3, further comprising:

a plurality of first connectors that connect a plurality of storage battery packs in parallel;

a plurality of second connectors that are provided inside the casing and connect a plurality of storage battery packs in series; and control circuitry that supplies power to the external electrical device connected to the power supplier, by using the discharger to discharge at least the storage battery packs connected to the plurality of second connectors.

14. The storage battery housing device according to claim 13, wherein the plurality of second connectors are arranged inside the casing in positions where it is more difficult for the storage battery packs to be attached and detached thereto than the plurality of first connectors.

15. The storage battery housing device according to claim 3, further comprising:

a switch that switches between supplying power from the external power source to the external electrical device connected to the power supplier, and supplying power to the external electrical device connected to the power supplier by the discharger discharging the storage battery pack connected to the connector.

16. The storage battery housing device according to claim 15, further comprising:

control circuitry that, when a power supply from the external power source stops, uses the switch to supply power from the storage battery pack to the external electrical device connected to the power supplier.

17. The storage battery housing device according to claim 1, further comprising:

a fixer that fixes, to the connector, the storage battery pack connected to the connector; and control circuitry that, when a power storage amount of the storage battery pack connected to the connector is low, controls the fixer to fix the storage battery pack to the connector, and when the power storage amount of the storage battery pack is high, controls the fixer to release the fixing of the storage battery pack to the connector.

18. The storage battery housing device according to claim 1, wherein the information is reflected and projected toward the front of the shelf using a light guide.

* * * * *